United States Patent
Duhon

(10) Patent No.: US 7,584,146 B1
(45) Date of Patent: *Sep. 1, 2009

(54) CONSUMER CREDIT DATA STORAGE SYSTEM

(75) Inventor: Eric M Duhon, Katy, TX (US)

(73) Assignee: Innovis Data Solutions, Inc., Columbus, OH (US)

( * ) Notice: Subject to any disclaimer, the term of this patent is extended or adjusted under 35 U.S.C. 154(b) by 1318 days.

This patent is subject to a terminal disclaimer.

(21) Appl. No.: 09/957,214

(22) Filed: Sep. 19, 2001

Related U.S. Application Data

(63) Continuation of application No. 09/095,779, filed on Jun. 11, 1998, now Pat. No. 6,311,169.

(51) Int. Cl.
*G06Q 40/00* (2006.01)

(52) U.S. Cl. .................................... 705/38; 705/35

(58) Field of Classification Search .................. 705/35, 705/38

See application file for complete search history.

(56) References Cited

U.S. PATENT DOCUMENTS

| | | | | |
|---|---|---|---|---|
| 4,727,243 A | 2/1988 | Savar | | 235/379 |
| 5,025,138 A | 6/1991 | Cuervo | | 705/38 |
| 5,148,432 A | 9/1992 | Gordon et al. | | 371/10.1 |
| 5,237,658 A | 8/1993 | Walker et al. | | 395/200 |
| 5,274,547 A | 12/1993 | Zoffel et al. | | 364/408 |
| 5,333,314 A | 7/1994 | Masai et al. | | 395/600 |
| 5,379,417 A | 1/1995 | Lui et al. | | 395/575 |
| 5,379,418 A | 1/1995 | Shimazaki et al. | | 395/575 |
| 5,408,649 A | 4/1995 | Beshears et al. | | 395/575 |
| 5,437,024 A | 7/1995 | French | | 395/600 |
| 5,446,885 A | 8/1995 | Moore et al. | | 395/600 |
| 5,471,629 A | 11/1995 | Risch | | 395/800 |
| 5,491,817 A | 2/1996 | Gopal et al. | | 395/600 |
| 5,564,047 A | 10/1996 | Bloem et al. | | 395/600 |
| 5,592,664 A | 1/1997 | Starkey | | 395/600 |
| 5,611,052 A | 3/1997 | Dykstra et al. | | 395/238 |
| 5,680,602 A | 10/1997 | Bloem et al. | | 395/601 |
| 5,689,705 A | 11/1997 | Fino et al. | | 395/617 |
| 5,732,400 A | 3/1998 | Mandler et al. | | 705/26 |
| 5,774,883 A | 6/1998 | Anderson et al. | | 705/38 |
| 5,805,881 A | 9/1998 | Kiuchi et al. | | 707/1 |
| 5,878,403 A | 3/1999 | DeFrancesco et al. | | 705/38 |
| 2004/0199456 A1* | 10/2004 | Flint et al. | | 705/38 |

FOREIGN PATENT DOCUMENTS

WO    WO 9625717 A    8/1996

OTHER PUBLICATIONS

U.S. Appl. No. 60/222,205.*
"Quicken Deluxe: Version 5 Fior Windows", (Menlo Park; Intuit, Inc., 1995), pp. 124, 125, 179, 185 & 187-198. (Jan. 1995).
Yakal, Kathy, "Quicken Deluxe for Windows." PC Magazine. (Jan. 21, 1997), pp. 1-5.

(Continued)

*Primary Examiner*—Lalita M Hamilton
(74) *Attorney, Agent, or Firm*—Roger N. Chauza, PC

(57) ABSTRACT

A consumer credit information data base for storing current consumer credit information, as well as historical credit data information. On-line computerized systems can access the data base and present current and historical credit data information to users so that better assessments can be made as to the credit worthiness of a consumer.

20 Claims, 16 Drawing Sheets

OTHER PUBLICATIONS

"Quicken Deluxe: Version 5 for Windows." (menlo Park; Intuit, Inc., 1995) pp. 124, 125, 179, 185 & 187-198 (Jan. 1995).

Yakal, Kathy. "Quicken Deluxe for Windows." PC Magazine. (Jan. 21, 1997) pp. 1-5 (Jan. 1997).

* cited by examiner

FIG. 4

| Search | Options | Reports | Graphs | Print | Help | Exit |

Trade Line Information

| Grid Delinquency | Graph Trade Line | Graph Profile | Sort |

| Grantor Name | Acct Type | Terms | Dt Rpt | Cr Limit | Acct Status | Payment | High Del |
| ECOA/Opened On | Busn Type | Min Pay | Lst Act | Cur Bal | Past Due Amt | History | Comment |
|---|---|---|---|---|---|---|---|
| THE LIMITED | 26 | 30 | 06/96 | 1000 | COLLECT | 2210000000000 | 07/96-60 |
| 0  DEC-14-1984 | REVOLVIN | 453 | 06/96 | 1107 | 320 | 001001000100 | COL |
| CAPITOL ONE-VISA | 18 | 30 | 07/96 | 3200 | CURRENT | 000000100000 | 01/96-30 |
| 0  DEC-11-1979 | REVOLVIN | 67 | 07/96 | 3231 | 0 | 000000000000 | |
| CHRYSLER CREDIT | 00 | 30 | 08/96 | 16600 | CURRENT | 000000000000 | |
| 0  OCT-30-1986 | INSTALL | 200 | 08/96 | 9000 | 0 | 000000000000 | |
| CHASE BANK | 18 | 30 | 01/95 | 1700 | PAID SAT | 000000000000 | |

Count*4

CONSUMER CREDIT DATA STORAGE SYSTEM

CROSS-REFERENCE TO RELATED APPLICATIONS

The present application is a continuation of pending U.S. application Ser. No. 09/095,779 filed Jun. 11, 1998, entitled "On-Line Consumer Credit Data Reporting System", now U.S. Pat. No. 6,311,169. The disclosure of the application is incorporated herein by reference.

TECHNICAL FIELD OF THE INVENTION

The present invention relates in general to a data storage system for storing historical consumer credit data. In particular, the present invention relates to a consumer credit data storage which stores credit data over a period of time so that on-line users can retrieve the historical data and make better judgments of a consumer's credit worthiness.

BACKGROUND OF THE INVENTION

The domestic consumer reporting industry serves the expanding information requirements of an increasingly credit driven economy. Low interest rates and increasing competition in the credit card industry have fueled increased demand for consumer credit information.

The principal customers of the industry's credit information services are: (1) national, regional and local credit card issuers; (ii) commercial banks and consumer finance companies; (iii) mortgage companies; (iv) collection agencies; and (v) other entities engaged in either the granting of consumer credit or marketing of services predicated on the credit worthiness of the consumer. Products and services offered to these customers by the credit reporting industry include consumer credit reports, credit risk scores, prescreened lists and skip-tracing services. Skip-tracing is a term to connote those consumers who have failed to comply with a payment program, and who cannot be located.

Traditionally, national, regional and local credit grantors have provided consumer account histories to the major credit repositories free of charge. The credit grantors are incentivized to do so because they are also purchasers of credit reports. The quality of the credit information they receive thus depends upon the voluntary cooperation of all major credit grantors. Also, credit grantors believe that consumers are more likely to pay promptly if they are aware that their payment histories are being reported to the major credit repositories. Credit repositories also gather relevant data regarding bankruptcy filings and tax liens from courthouses and other public records agencies.

These records are combined with the credit grantor data into large centralized databases which are used to compile consumer credit reports and other industry products.

These major credit repositories have been maintained primarily by divisions of TRW Inc., Equifax Inc., Trans Union Corporations, and more recently by Consumer Credit Associates, Inc. Traditional credit reporting businesses store a substantial amount of credit information for many consumers. Sometimes there is so much information on the individual consumers that an on-line review of the information is time consuming and often the data or information is either contradictory or inaccurate. A major shortcoming of the presentation of consumer credit is that it is only a snapshot of the consumer credit worthiness for a short period of time. Indeed, many of the data bases of the credit reporting business are maintained primarily for current data. All credit data that is older than, for example, a few months, is discarded as being unimportant. A snapshot of a person's credit for a short period can be very deceiving, thus allowing for an erroneous extension of credit when it shouldn't be extended, or a denial of credit when it should be extended.

As an example of the foregoing, consumer A may have used his/her credit card during one or more holidays so as to incur a substantial balance with the credit card issuer. However, the past history of consumer A shows that he/she pays off the balance over a period of time, which is exactly the type of credit card use that is desired by the credit card issuer.

Consumer B, on the other hand, is running up a credit card balance because of financial, family, or other problems, and does not intend to pay off the balance. Rather, it is consumer B's intention to either refuse to pay toward the balance, or declare bankruptcy. In addition, the credit history of consumer B shows that he/she is always late in payments and the balance continues to rise. At some point in time, the respective balance of consumer A and B may be the same. If a snapshot view of the traditional credit information of consumer A and B is viewed, they do not look substantially different. However, consumer A is clearly a better risk for extending credit as compared to consumer B. Until the credit histories are made available to the users of the credit information, the significant difference in credit risks of consumers A and B will not be realized.

From the foregoing, it can be seen that a need exists for a credit information data base and processing system that provides a user with many options and alternatives in ascertaining the credit history of a consumer. Another need exists for an improved graphical user interface that provides the credit history information in an efficient and understandable manner.

SUMMARY OF THE INVENTION

The present invention relates to an on-line consumer credit reporting system utilizing relational database technology and a single-instance database of consumer credit histories that enable more rapid response to customer needs. Data is collected periodically from local and regional credit grantors and stored in a massive capacity disk storage array. By retaining the original and all new data from the credit grantors, a complete credit history for each credit consumer is available. Moreover, royalty payments are avoided by bypassing regional credit bureaus in the data collection process.

In accordance with another aspect of the invention, the invention provides user-friendly, windows-based client software allowing for graphical interpretation of consumer credit histories and easy retrieval and analysis of credit reports. In particular, the consumer credit history stored in the massive capacity disk storage array enables the calculation of data and the display of twenty four month consumer trend data. This enables credit grantors to better identify consumers with improving and deteriorating credit balances. In the preferred embodiment, the historical credit data of a consumer is maintained for at least a twenty four month period so as to be processed and made available as raw data arranged in chronological order, or presented in singular or multiple graphical representations.

In accordance with yet another aspect, the invention provides a method of more direct access to the data base by high volume users in need of data for their own internal computing and credit assessment operations.

In accordance with still another aspect of the invention, data associations are automatically made between reported consumers, thereby facilitating skip-tracing, marketing, and other activities.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts, functions or elements throughout the views, and in which:

FIG. 4 is a search screen presented to the on-line customer by the GUI;

FIG. 6 is a tradeline information screen presented to the on-line customer by the GUI;

FIG. 14 is a consumer demographic information screen presented to the on-line customer by the GUI;

DESCRIPTION OF THE PREFERRED EMBODIMENT

Figure 1:
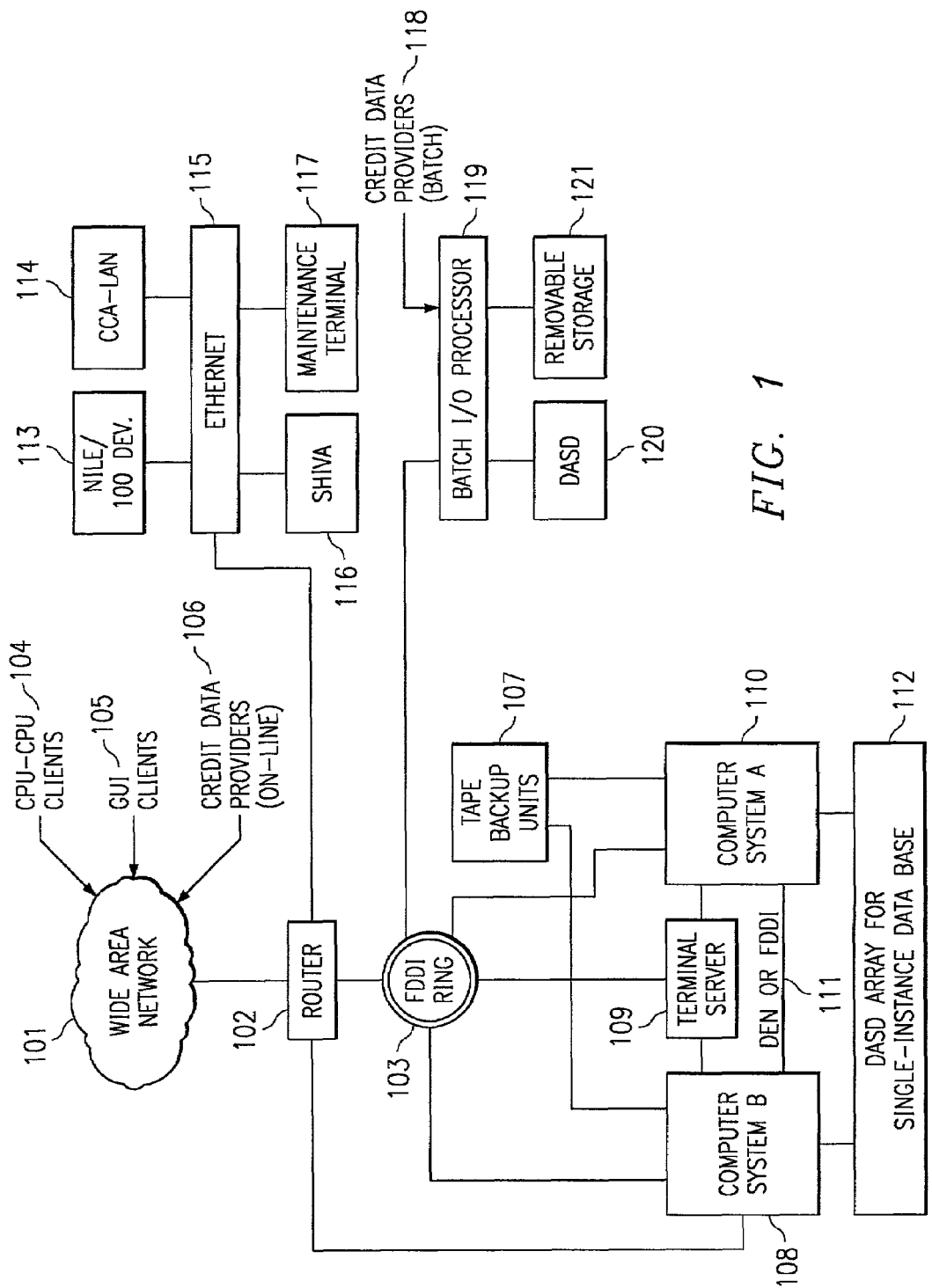
FIG. 1 is a block diagram of the hardware in a preferred embodiment of an on-line consumer credit data reporting system of the invention.

Turning now to FIG. 1, there is shown a block diagram of a preferred embodiment of an on-line consumer credit data reporting system constructed to embody the principles and concepts in accordance with the present invention. The system has two high-speed data processing units denoted as computer system "A" 110 and computer system "B" 108. Preferably, computer system "A" 110 and computer system "B" 108 each include a Pyramid Nile 150 digital computer. Both computers 108 and 110 utilize MIP R4400 processors working in a SVR4 UNIX environment termed DCOSX. Preferably, computer systems "A" 110 and "B" 108 each contain twelve 200 MHZ CPUs and three gigabytes of random access memory (RAM). The computers 108 and 110 may be symmetric multi-processor (SMP) machines that can be scaled to a node on a multi-processor platform (MPP) cluster when business requirements necessitate the migration.

Consumer credit data is stored in a direct access storage device (DASD) array 112 in the form of a single-instance data base. Each computer system 108 and 110 has equal access to the DASD memory array 112. Preferably, the DASD array 112 organizes 2.212 terabytes in High Availability Access Storage (HAAS) bays 112 which comprises 336 hard disk drive units made by Siemens Pyramid, each capable of storing seven Gigabytes of data. The HAAS bays are fully mirrored and the systems are duplicated in configuration for full failover capability. The HAAS bays 112 store information related to each consumer for the preceding twenty-four month period, thereby presenting a more complete credit history and enabling various other products to be supplied to clients 104 and 105, as will be further described below. In addition to the twenty-four (24) month credit history and related summary information, HAAS bays 112 store the originating data, thereby allowing tracing of the source of summary information.

The system is set up for all users 104, 105 and 106 to log directly into computer system "B" 108 to establish a session with the on-line consumer credit reporting system. As will be further described below, the on-line customers include CPU-CPU clients 104 and GUI clients 105. The users may also include on-line credit data providers 106. Users 104, 105 and 106 may be located anywhere in the world and access the system through the wide area network (WAN) 101. The WAN 101 may support a variety of communication protocols including Dial Up Async, Dedicated Async, BiSync 3270, SDLC LU2 3274, SDLC LU 6.2, 3270 terminal emulation, and custom CPU-CPU interface protocols.

Requests and traffic from the on-line users on the WAN 101 are sent to the router 102 which then directs traffic either directly to computer system "B" 108 or indirectly with the fiberoptic distributed data interconnect (FDDI) ring 103. Terminal server 109 is connected to computer system "A" 110, computer system "B" 108 and FDDI ring 103 and functions as a local interface and control over the connected systems. This design isolates all overhead related to the log-in process from the data base engine which processes data base access commands. Information requests are then passed to computer system "A" 110 via an application link over either a dual Ethernet network or an internal FDDI connection 111. Computer system "A" 110 then accesses the information stored on the DASD array 112. DASD array 112 is a mirrored storage system wherein all data is stored in a duplicated manner, thereby increasing system reliability. Although all data is stored twice, the data base is a single-instance data base in that all reporting and updating occurs on a single data base as opposed to the conventional use of separate data bases where one is used for reporting and another for updating. In addition, computer systems "A" 110 and "B" 108 are each equipped to perform the operations of the other computer system so that, in the event of a failure by any one computer system, the other computer system can perform all the functions of the entire system. This capability is referred to as failover and results in increased system reliability. Tape backup units 107 provide a means for archival storage on removable media of the information in DASD 112.

Information in batch form may be provided directly by batch credit data providers 118 or indirectly via removable storage media 121. In the preferred embodiment, removable storage media 121 supports a variety of storage formats including IBM 3174, 3203, 3504, 1270, 3490, 3480, 3803, 3420 and is capable of translating between the several formats. Alternatively, the DASD 120 can be part of the DASD 112. Information provided in this form is processed by the batch I/O processor 119 and may be stored locally in a DASD 120 or on the removable storage 121. In the preferred embodiment, DASD 120 is manufactured by the EMC Corp. and is capable of storing at least 127.5 gigabytes. Information processed by the batch I/O processor 119 is then passed through FDDI ring 103 before updating the DASD array 112.

The system in FIG. 1 further includes a maintenance and development environment including components 113, 114, 115, 116, 117. Requests from this maintenance and development environment are sent to the router 102 for transfer to the other components of the system in FIG. 1. Nile/100 Dev. 113 is preferably a Pyramid Nile 100 computer on which applications for computer systems "A" 110 and "B" 108 may be developed. CCA-LAN 114 is a local area network (LAN) capable of supporting multiple workstations for general maintenance and development of applications that are first tested on the Nile/100 Dev. 113 before being made operational on computer systems "A" 110 and "B" 108. SHIVA 116 is a communications server or modem which provides the capability for communication with computers not physically located in proximity to the remainder of the development environment (113, 114, 115, 117). Ethernet 115 is a computer network connecting and allowing communication among and between the development environment (113, 114, 117, 116) which is further connected to router 102 for communication with the remainder of the system. Maintenance terminal 117 is a computer terminal for monitoring and maintenance of the Ethernet network 115. The system in FIG. 1, for example, may support 15,000 on-line users, and exist in both an SMP and MPP environment. The system uses the industry's leading relational data base management system, Oracle release 7, which has the ability to scale into multi-terabyte systems on various operating platforms.

Figure 2:
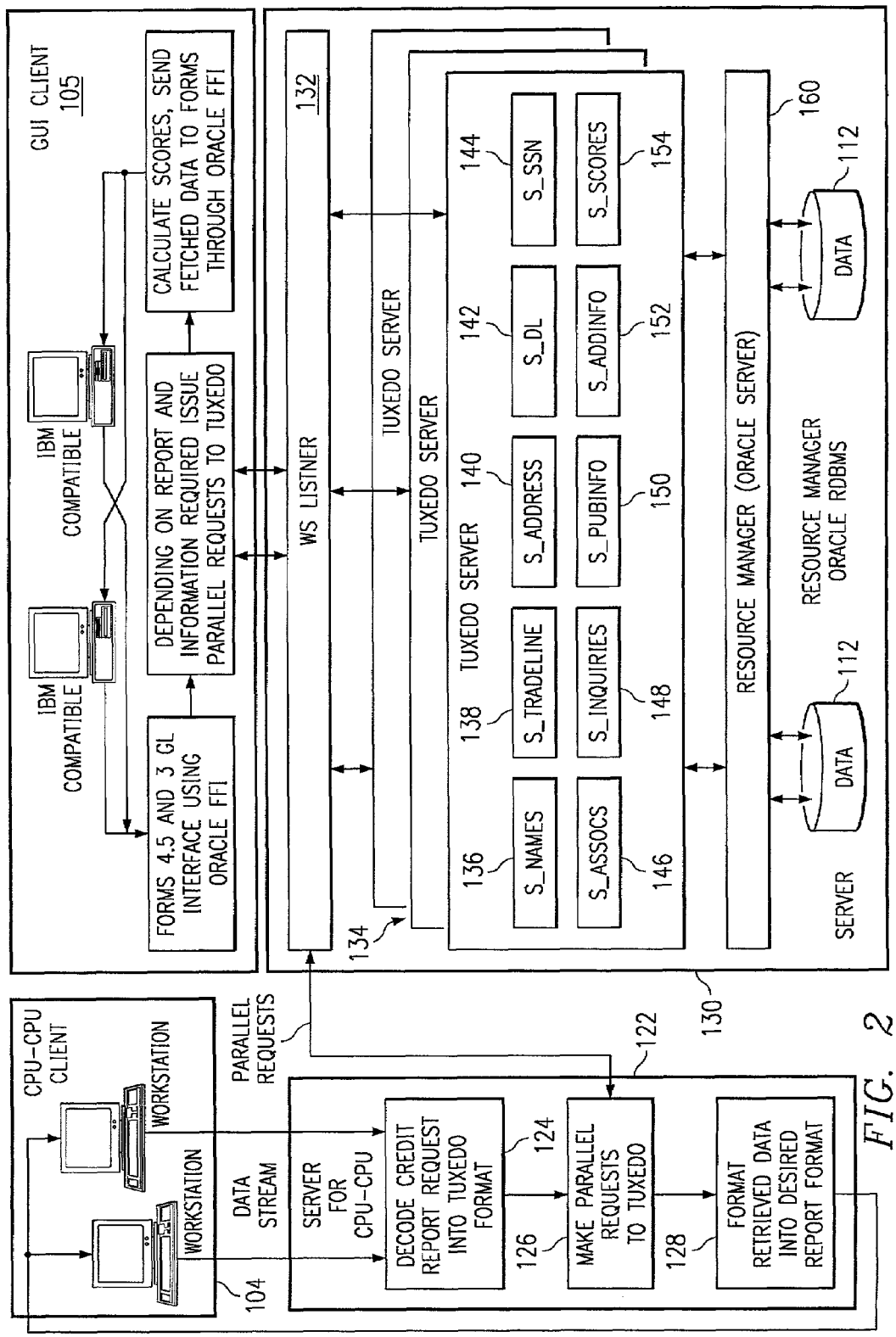
FIG. 2 is a block diagram of the software functions performed in the on-line consumer credit data reporting system of FIG. 1.

Turning now to FIG. 2, there is shown a block diagram of the operation of the preferred embodiment and the servicing of data requests and logical flow of information through the on-line consumer credit data reporting system of FIG. 1. As shown in FIG. 2, requests for information may come from either CPU-CPU clients 104 or from graphical user interface (GUI) clients 105. In the preferred form of the invention, the computer system "B" (108 of FIG. 1) is programmed to carry out the server functions illustrated in FIG. 2, except for all of the resource manager functions, which are normally performed by computer system "A" (110 of FIG. 1).

CPU-CPU clients 104 are high volume users of the data base 112 that require data in an electronic format suitable for further processing on computers at the CPU client location. Typically, CPU-CPU clients 104 develop applications that operate on the CPU-CPU client digital computers, but require data stored in the on-line consumer credit data reporting system. Further processing at the CPU-CPU client site may be electronic or manual. Requests from CPU-CPU clients 104 are standardized by computer system "B" 108 for submission to the data base engine operating on computer system "A" 110 (or computer system "B" 108 in the event of a failure of computer system "A" 110). Although a particular CPU-CPU client 104 may generate a large number of requests for data nearly simultaneously, the requests are processed in a sequential fashion to reduce system load and ensure consistent response times to on-line user requests.

The commands and requests of consumer credit data from the CPU-CPU clients 104 are processed by a server 122, which comprises software resident in the computer system "B" 108. The parallel requests received by the CPU-CPU client workstations are decoded by program 124 and placed into a TUXEDO format. TUXEDO is a well-known server software package sold by BEA Inc. of Sunnyvale, Calif. The TUXEDO server eliminates duplicate requests, thereby resulting in reduced load on computer system "A" 110. The credit data requests of the TUXEDO format are placed in parallel form by the software 126.

Information returned by computer system "A" 110 is then reformatted for presentation to the CPU-CPU clients 104. Requests submitted by GUI clients are processed in the same general fashion as noted above, except that the information is presented to the on-line user in a format suitable for efficient communication to human operators. The format of presenting credit information to GUI users is shown in FIGS. 3-14. The requested consumer credit data information retrieved from the data base 112 is returned to software block 126 of the server 122. Such information is then passed to software block 128 where it is placed into the appropriate format that is conveniently used by the CPU-CPU clients 104. When placed in the reporting format, the credit data is transmitted back to the requesting workstation of the CPU-CPU client 104.

Returning to the processing of credit data requests, the various software functions programmed into computer system "A" 110 are shown, in part, by the block labeled with reference numeral 130.

The server 130 of the computer system "A" (110 in FIG. 1) functions as a resource manager 132 by identifying formatted requests for information from CPU-CPU or GUI clients 104 and 105. Preferably, the computer system "A" (110 in FIG. 1) employs ORACLE server software for the resource management. Requests received from any of the clients are processed by the ORACLE server data base engine 160 for servicing. Separate tables for data fields are maintained, thereby reducing lookup time. These tables are accessed by respective programs executed by a TUXEDO server 134. The tables include, for example, consumer names 136, tradelines 138, (i.e., credit lines such as Mastercard, VISA, American Express, CitiBank), consumer addresses 140, driver's license numbers 142 (DL), social security numbers (SSN) 144, associations 146 (described further below), inquiries 148, public information 150 (tax liens, judgments, bankruptcies), additional miscellaneous information 152, and credit worthiness scores 154. Lastly, the ORACLE resources manager 160 services the requests by accessing the data base 112 to find the information in reply to such requests.

The foregoing computer equipment and peripherals are programmed to respond to on-line user demands for carrying out various calculations of consumer credit data to present credit information in numerical and graphical formats, as shown in the following GUI screen displays. In accordance with an important feature of the invention, the consumer credit data entered into the data base is not only maintained for a long period of time, the data is accumulated for various parameters, such as current balance, past due amount, etc. and enables on-line users to make better decisions as to credit changes of the consumers.

Figure 3:
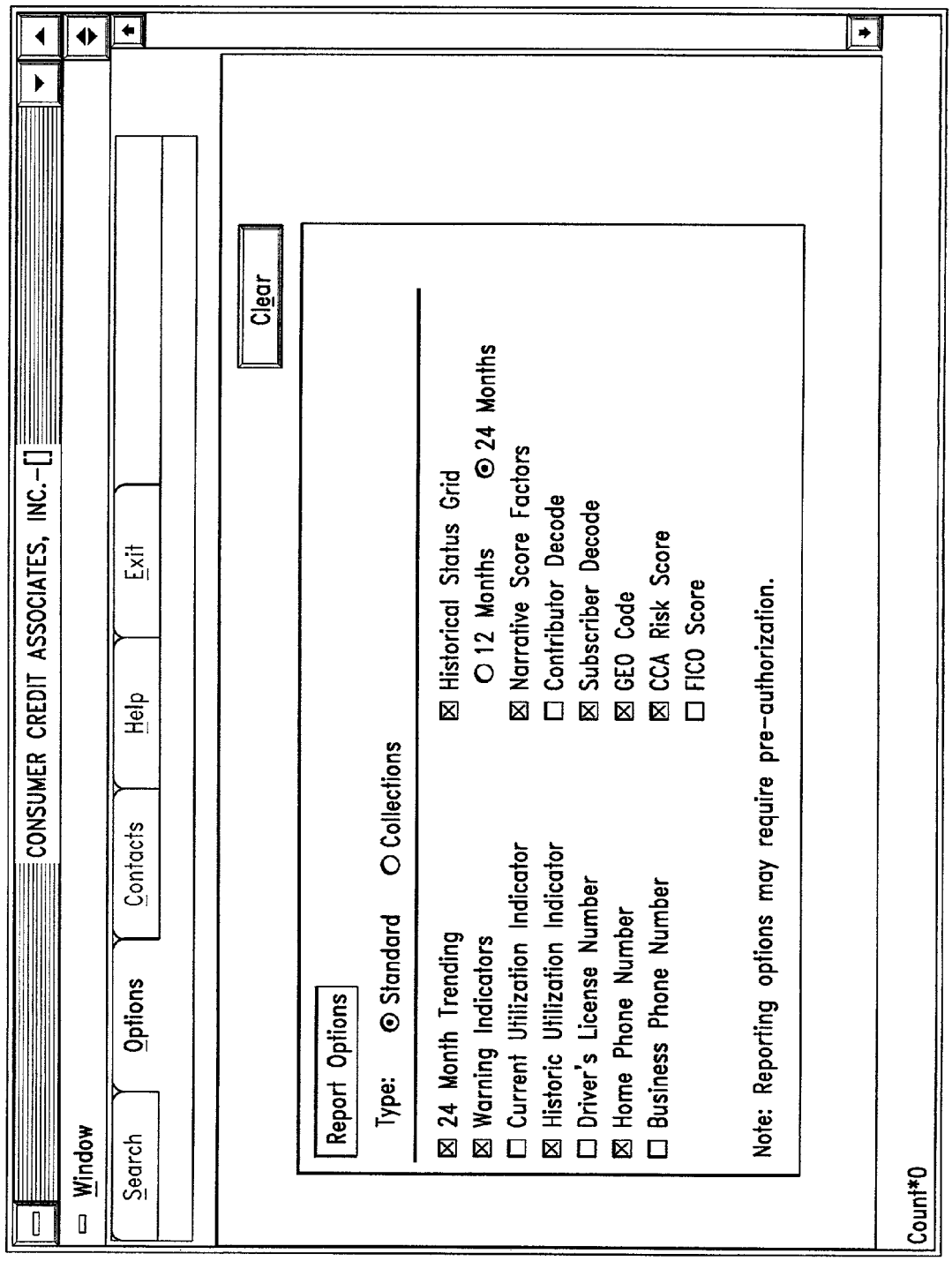
FIG. 3 is an options screen presented to an on-line customer by the on-line graphical user interface (GUI) of the on-line consumer credit data reporting system of FIG. 1.

Turning now to FIG. 3, there is shown an options screen wherein on-line customers have the opportunity to change credit reporting options during an on-line session. Options may be selected individually or according to standardized options packages as shown. Included among the options is the reporting of historic data for the twenty-four month period preceding the latest report, and the ability to display information for the preceding twelve or twenty-four month period in a compressed numerical grid format. With the information thus presented, an on-line user can trace the origins of a consumer's present credit status, including individual and total balances paid, and determine if there is a trend, i.e. if the credit status is improving or deteriorating, this is significant in determining whether to change the credit rating of the consumer, discontinue extending credit, increase collection efforts or to terminate the account. Conventional credit reporting systems report a tally of the number of times a consumer has been delinquent and total delinquency, but do not reflect the more detailed information supplied by the system of FIG. 1. A significant feature of the invention is the ability to change reporting options during an on-line session (i.e., point and click). It should be noted that the various screens of FIGS. 3-14 are selected by the user by selecting or clicking on the subject matter areas of the top of the respective screens.

Figure 4:
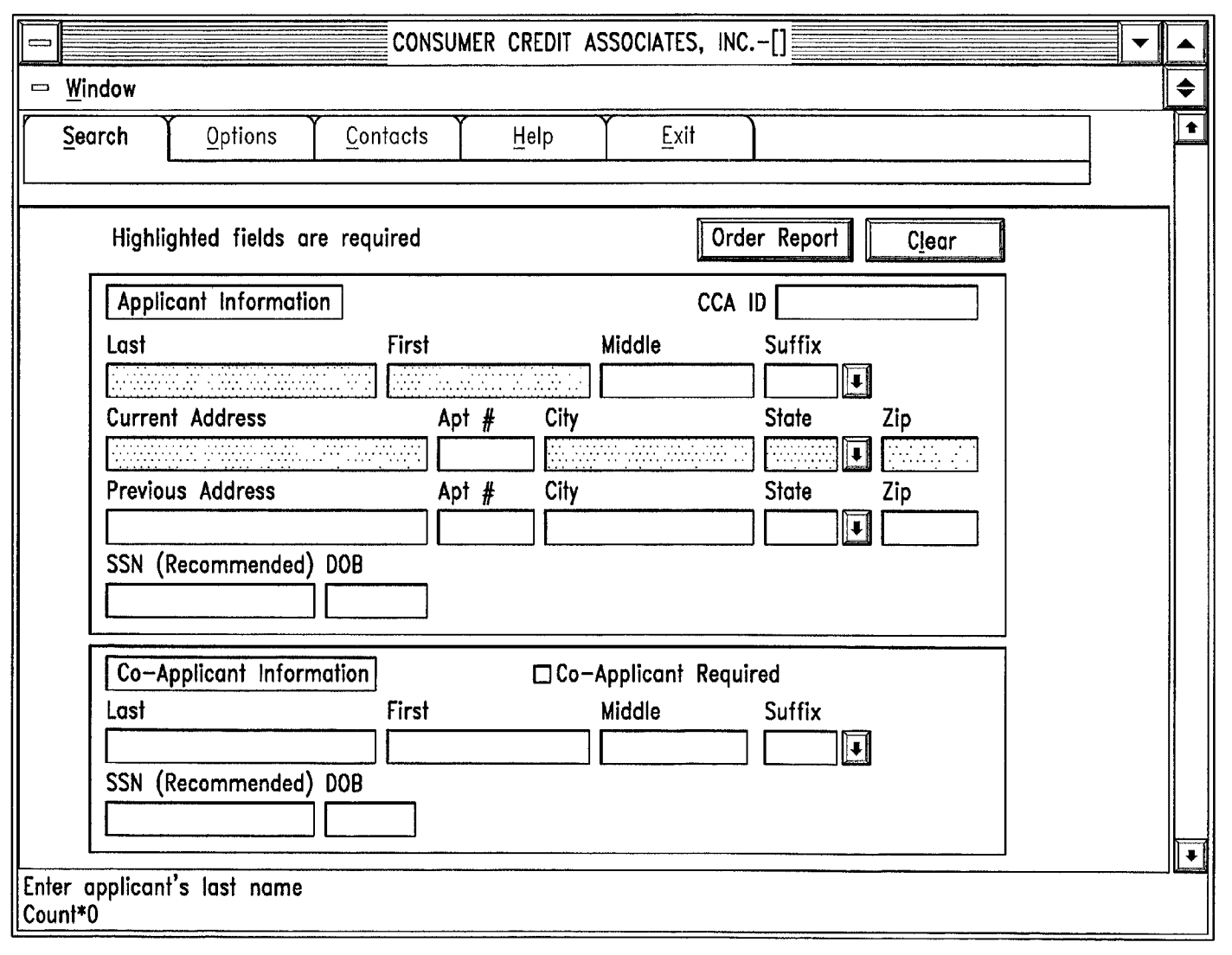

Turning now to FIG. 4, there is shown a GUI inquiry search screen where on-line customers can enter search criteria into predefined fields, thereby eliminating the complex series of commas, periods, and spaces utilized by the prior art technology. On-line customers can sequentially move between fields shown by pressing the TAB key of the keyboard. By entering information into the predefined fields, on-line users can create a customized search criteria. In addition, as shown in the figure by downward pointing arrows following fields, several of the predefined fields are capable of displaying a list of selections from which the on-line user may choose, for example, various "states" can be selected to modify the search criteria.

Figure 5:
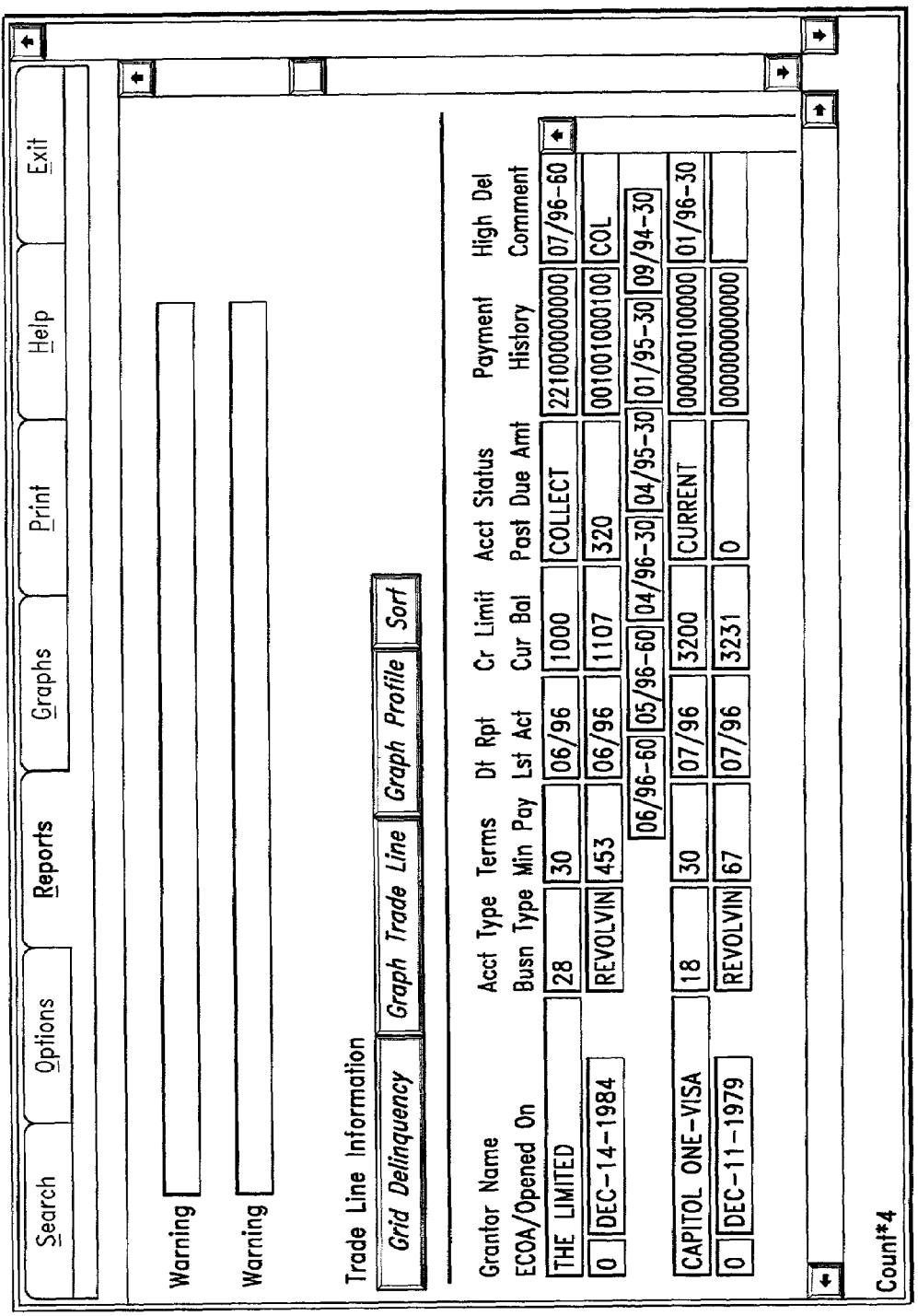
FIG. 5 is a standard credit report screen presented to the on-line customer by the GUI.

In FIG. 5, there is shown a GUI standard credit report screen displaying trade line information for the various credit lending institutions. While two such institutions are shown in the screen display of FIG. 5, others may be viewed by scrolling the bottom portion of the screen. In addition to other information presented on a particular account, the screen displays information regarding utilization of credit resources, thereby indicating substantial increases or decreases in credit usage. Information so presented is sorted by tradelines, which is information concerning a consumer's credit relationships with the various credit extending institutions. An object of the invention is to display only credit information relevant to a credit allocation decision.

In accordance with the display of the "Payment History" information, there is displayed for the business "The Limited" numerical information "221000000000". Each digit position indicates a 30-day period, and the value of each digit represents the number of 30-day periods the account was delinquent in paying the requisite amount towards reducing the balance of the account. The example screen of FIG. 5 shows that for the business "The Limited", the particular consumer was delinquent in payments 60 days, 60 days, 30 days, zero days, etc. This information does not provide the actual days when such delinquency occurred. Another important feature of this aspect is that the system further provides such dates in numerical form on the third line below the name of the business. In particular, this screen display shows that the actual date of delinquency, and the number of days delinquent. For example, the "06/96-60" indicates that as of June 1996, the account for The Limited business for the particular consumer was 60 days delinquent. On "05/96-60", the balance was still 60 days delinquent, and on 4/96 the balance was 30 days delinquent. Thus, on the same screen displayed to the user, not only are the delinquencies displayed, but the actual days also. This is important information that can be readily obtained without bringing up the other screens to obtain such information.

Figure 11:
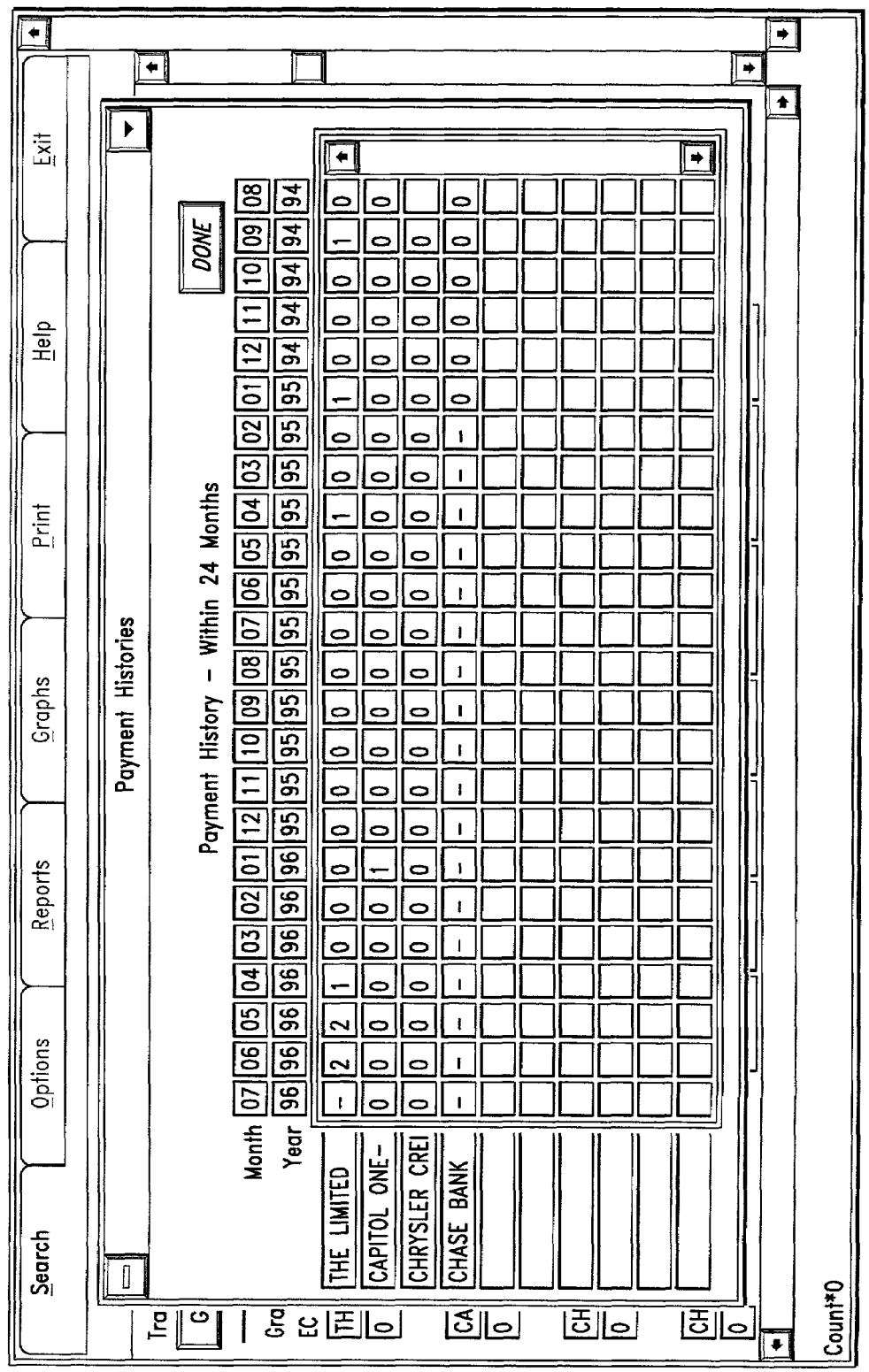
FIG. 11 is a delinquency bar graph screen presented to the on-line customer by the GUI to indicate months past due.

Referring now to FIG. 6, there is shown a GUI standard credit report screen displaying additional tradeline information. By selecting the scroll bars in the window, an on-line user can review all the tradeline information available for a particular consumer. As will be described below, by clicking on "Grid Delinquency", the numerical delinquency history is displayed, such as shown in FIG. 11. By clicking on "Graph Tradeline", a graphical display of the historical delinquency information is presented such as FIGS. 8 and 9.

Figure 7:
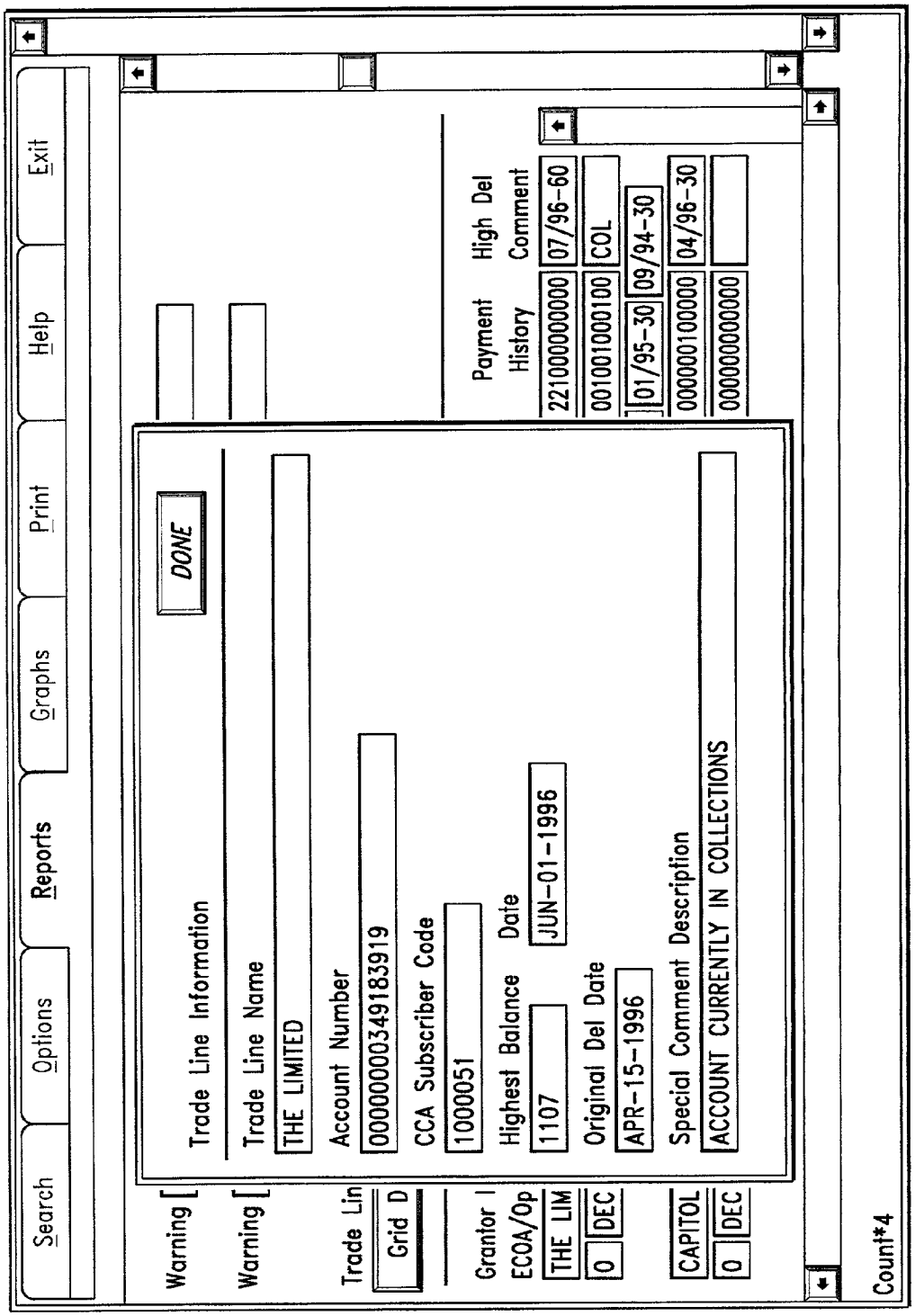
FIG. 7 is another tradeline information screen presented to the on-line customer by the GUI.

Turning now to FIG. 7, there is shown a GUI standard credit report screen overlaid on the screen of FIG. 6, displaying additional tradeline information on a particular credit grantor. By selecting any particular tradeline from the tradelines shown in FIG. 5 or 6, additional information is presented to the on-line user concerning that particular tradeline, including special comments. The screen display of FIG. 7 was obtained by pointing and clicking on "The Limited" displayed in FIG. 5 or 6. Here, there is shown additional and more particular data concerning the account with the particular credit grantor. The particular information shown indicates that as to the consumer identified by the account number, the highest balance occurred on Jun. 1, 1996 and the date of the original delinquency was Apr. 15, 1996. In the special comment section, it is noted that the particular account is in the collection process.

Figure 8:
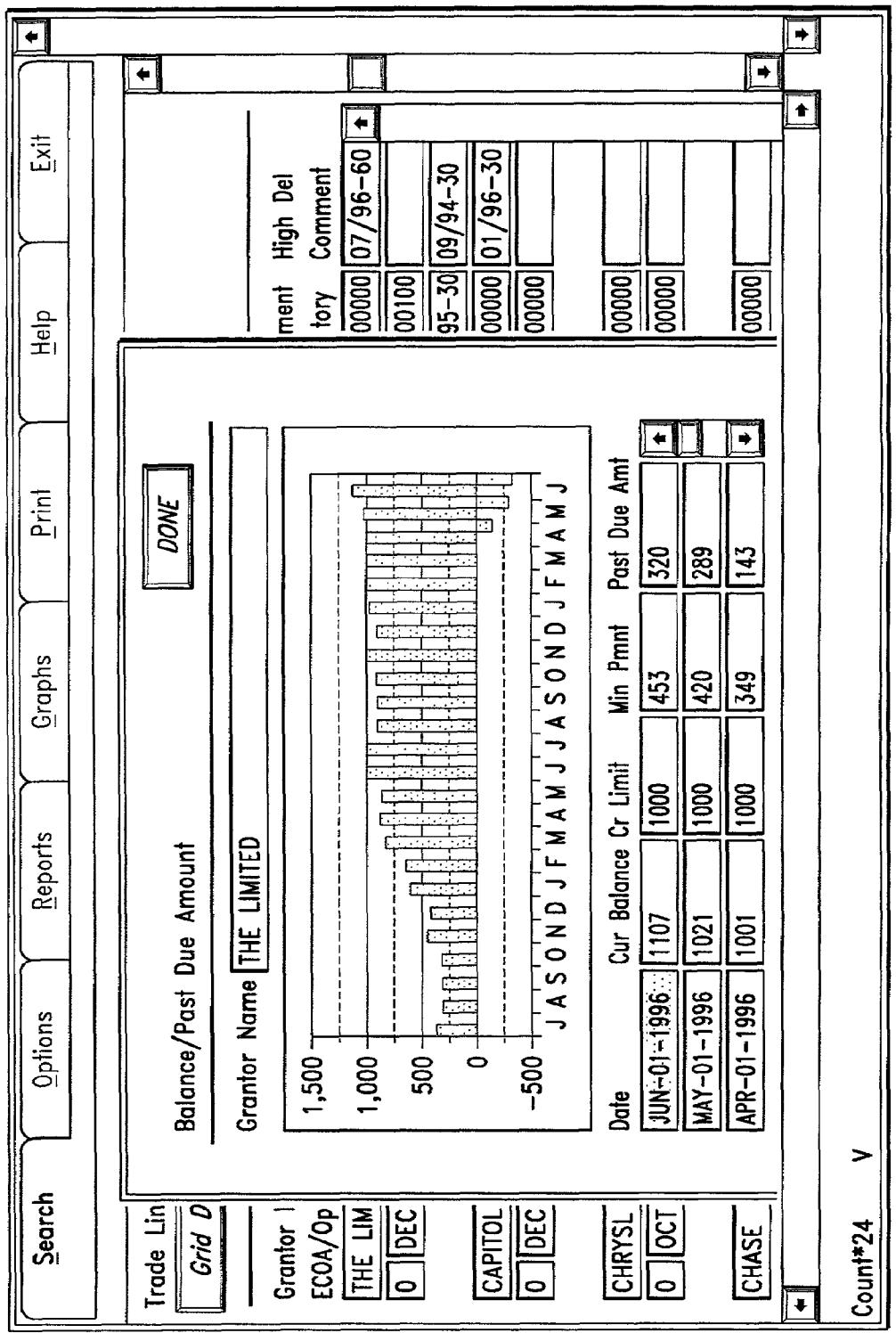
FIG. 8 is a graphical trend credit report screen presented to the on-line customer by the GUI in order to provide a twenty-four month credit history for a selected consumer.

Turning now to FIG. 8, there is shown a GUI report screen displaying a graphical presentation of information for the past twenty four months for a particular tradeline. Information is presented in a bar graph format and graphically shows the progression of payments and charges for the preceding twenty four month period, resulting in a highly efficient means of displaying information to the on-line user. The raw numbers used to generate the bar graph are made available to the on-line user through the scroll box appearing immediately below the bar graph. With the information thus presented, an on-line user can determine the historical trend with respect a particular tradeline for the preceding twenty four month period, as opposed to a simple indication of how many times a consumer has been thirty (30), sixty (60), or ninety (90) days past due on an account.

The vertical axis of the graph shows the dollar amount of the account balance, the bars of the graph above the "0" dollar balance amount show the particular amount of the balance for each of the calendar months. The bars below the zero-balance line show those months for which past due amounts have appeared. The numerical past due amounts shown on the grid at the bottom of the screen display correspond to the length of the bars extending below the zero-balance line. In like manner, the numbers in the "Cur Balance" column of the bottom grid of FIG. 8 correspond to the length of the current balance bars extending above the zero-balance line of the graph. Thus, both the numerical trend and the graphical trend are depicted on the same screen display so that the on-line use can make the best, most efficient and thorough analysis of the credit history of the user.

As can be appreciated from the foregoing, the same consumer credit data can be presented in many different formats, all according to the desires of the on-line user. For example, the historical data of a consumer, for each tradeline, can be displayed as set forth in FIG. 5, as the numerical grid at the bottom of the screen display of FIG. 8, and in graphical form as shown in the middle of the screen display of FIG. 8.

Figure 9:
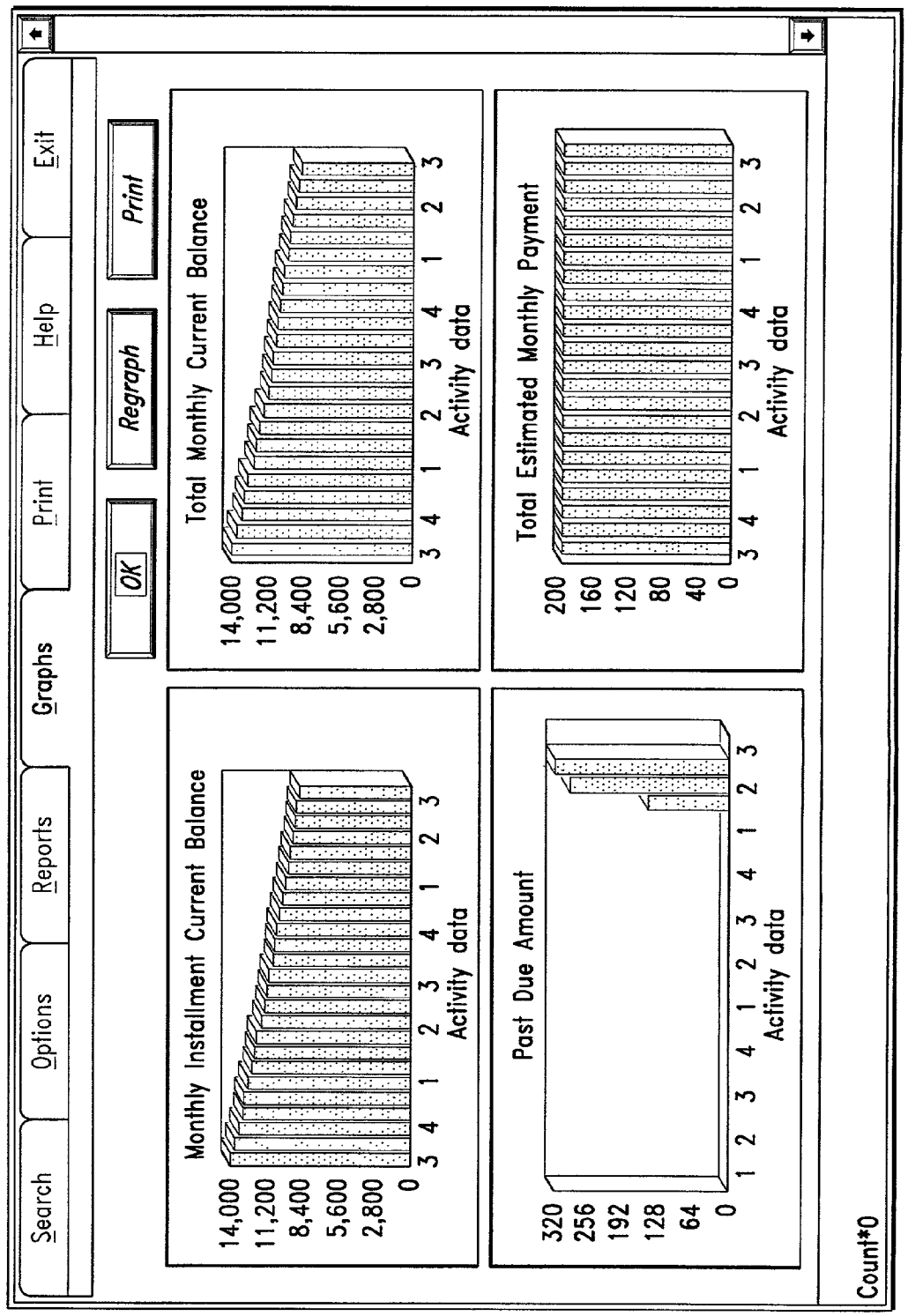
FIG. 9 is a multiple credit indicator bar graph screen presented to the on-line customer by the GUI to provide additional twenty-four month credit history information.

Turning now to FIG. 9, there is shown a GUI screen displaying multiple credit indicators in graphical format. Each credit indicator or datum is presented in a bar graph format for the preceding twenty-four month period, resulting in highly efficient means of displaying information to the on-line user. Information so displayed may be selected by the on-line user. The various credit indicators shown are monthly installment current balance, total monthly current balance, past due amount and total estimated monthly payments. Each data indicator provides trend information by quarters, over a two-year period. The past due amount shown in FIG. 9 corresponds to that shown in both graphical and numerical form in FIG. 8. The "Monthly Installment Current Balance" graph illustrates the aggregate of all credit account balances for the consumer of interest. By aggregating the data of all the accounts, a better appraisal of the overall credit picture can be made in a much smaller period of time.

Figure 10:
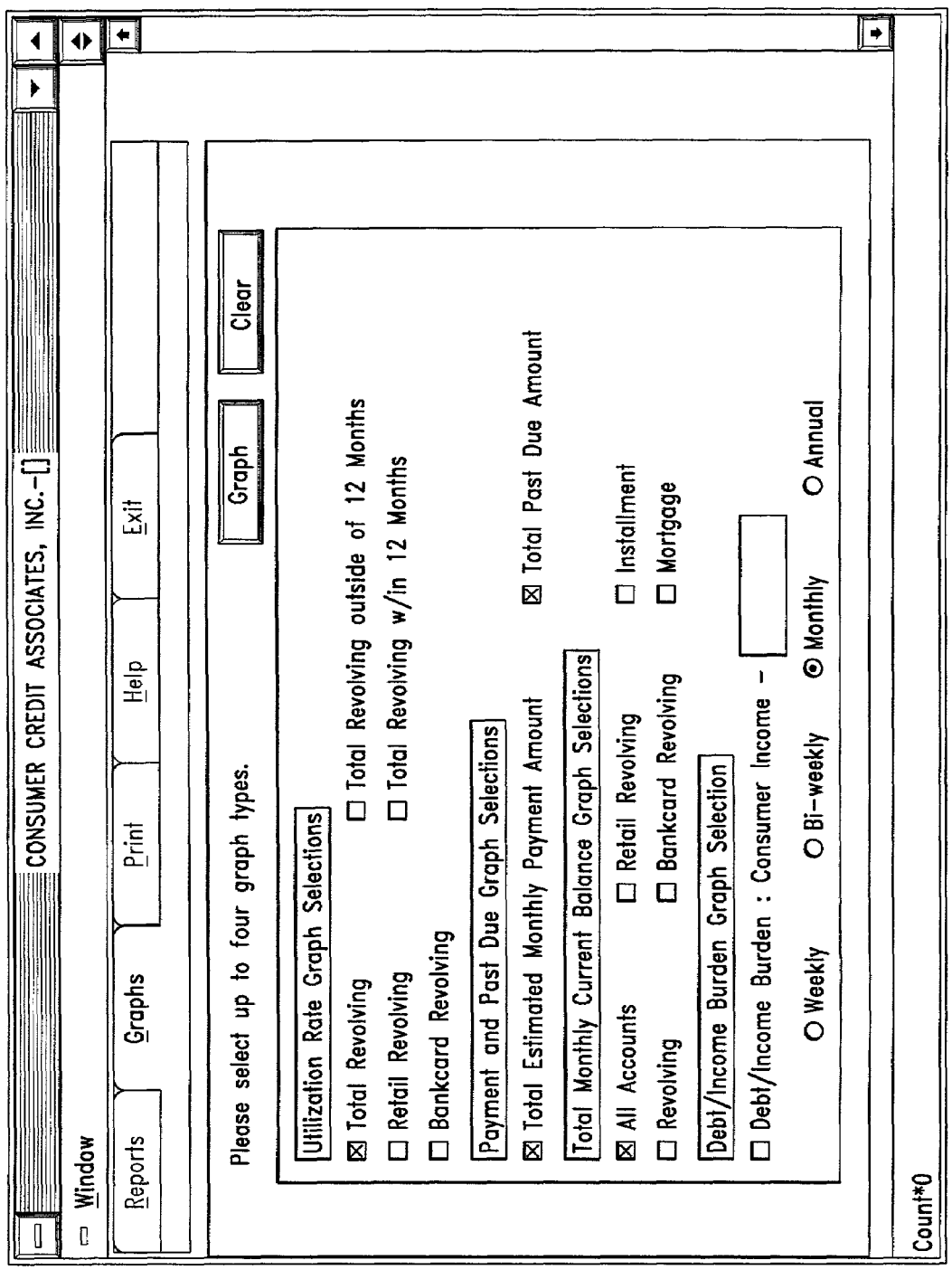
FIG. 10 is a display option screen presented to the on-line customer by the GUI for the selection of multiple graphical depictions.

With reference now to FIG. 10, there is shown a GUI screen where on-line users can select information to be presented in graphical format or in printed form as shown in FIG. 9. The point and click selection of "GRAPHS" brings up this screen display. Of the many graphical depictions that are available from this screen, four such graphs can be selected for display on a single display, such as shown in FIG. 9. Multiple display options are presented.

Turning now to FIG. 11, there is shown a GUI standard credit report screen where payment history for the prior twenty four months is displayed in a delinquency grid format. All tradeline data for a particular credit consumer is summarized in a grid format with numbers used to indicate months past due for particular tradelines. Again, the delinquencies are shown for 30-day periods, i.e., "2" means 60 days.

Figure 12:
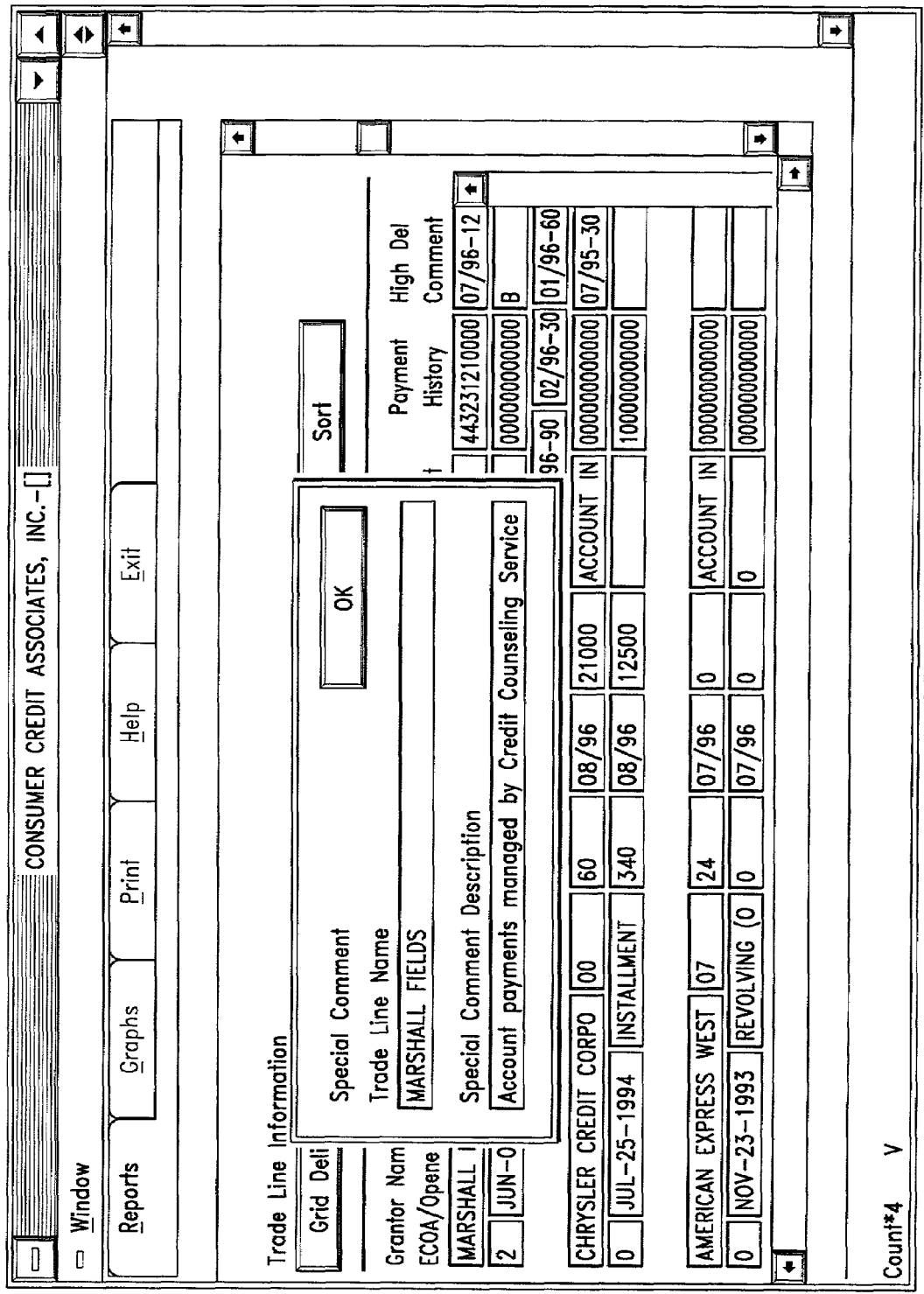
FIG. 12 is a special comment screen presented to the on-line customer by the GUI.

With reference to FIG. 12, there is shown a GUI standard credit report screen where special comments on particular tradelines can be entered and viewed by on-line users. The Special Comments area can be utilized for showing information relevant to other sections clicked. The comments shown in the screen display is a result of clicking on "col" for collections.

Figure 13:
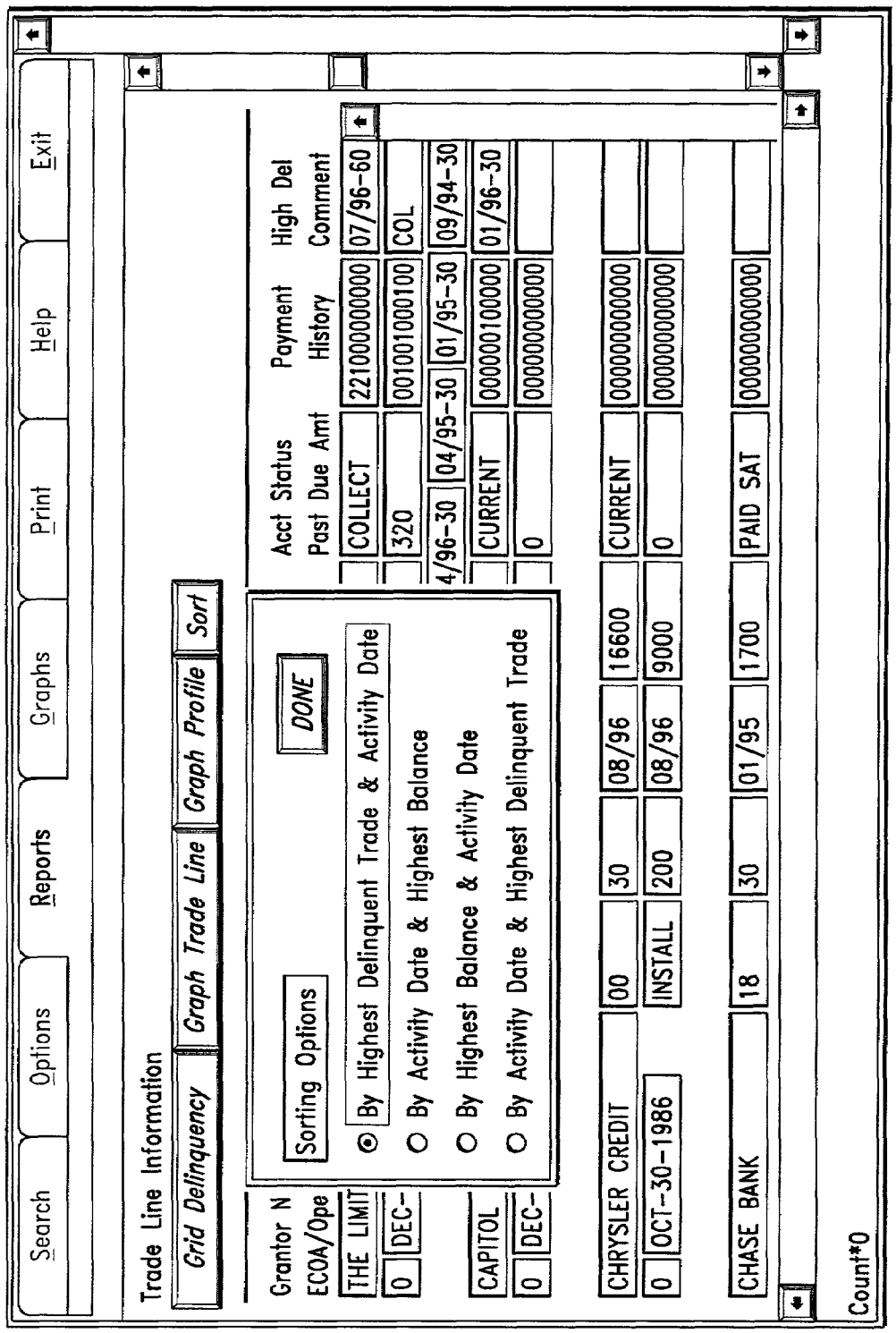
FIG. 13 is a sort option screen presented to the on-line customer by the GUI.

In FIG. 13, there is shown a GUI standard credit report screen where on-line users can select multiple sorting options for optimal presentation in user defined reporting environments. Thus, the presentation to any particular on-line user can be optimized by the on-line user for maximal efficiency and flexibility of presentation.

Figure 14:
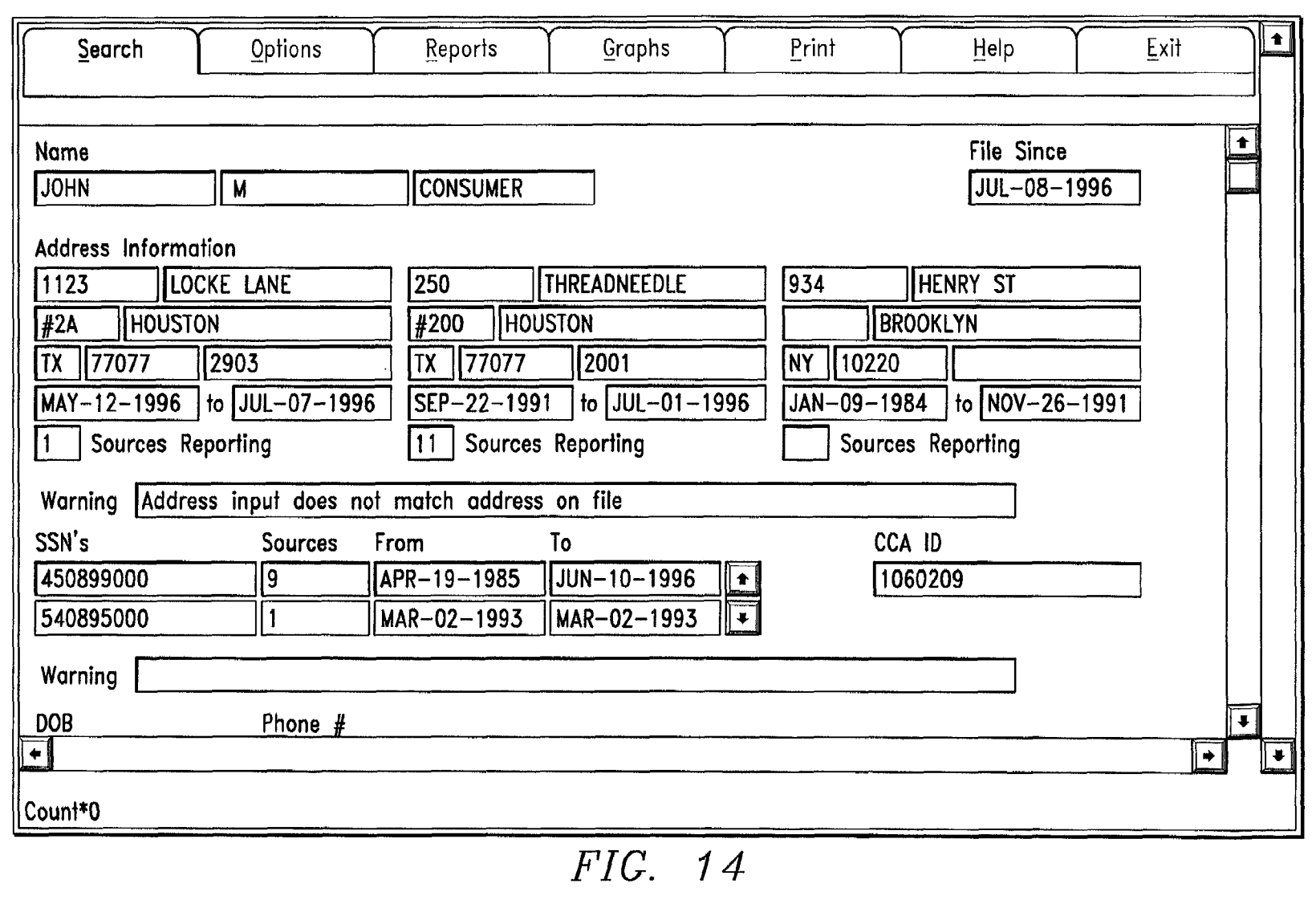

With reference to FIG. 14, there is shown a GUI standard credit report screen where consumer identifying demographic information can be entered or displayed. Identification information on each consumer is stored by the system including tracking of the number of credit information sources that have reported such information, and the dates. This tracking system enables an on-line user to determine the reliability of any particular piece of information.

This screen display depicts address information data for a particular credit consumer. As to the 1123 Locke Lane address, such address was first reported on May 12, 1996, and last reported on Jul. 7, 1996, with one source reporting such address. With respect to the 250 Threadneedle address of the same consumer, eleven tradeline sources reported such address between the dates of Sep. 22, 1991 and Jul. 1, 1996. An undisclosed tradeline reported that the consumer lived at the address of 934 Henry Street, but no reporting source reports that the consumer lives there any longer. The "warning" line indicates that the address input by the on-line user does not match any address on file.

Near the bottom of FIG. 14, there is illustrated the various Social Security Numbers reported by the consumer in applying for credit. While the Social Security Numbers are different, it is apparent that there was a simple transposition of the first two digits. In the "warning" line of the display, a statement can be displayed when the credit consumer submits a Social Security Number of a deceased person.

In addition to other features, the on-line consumer credit data reporting system can make and display associations between reported consumers. Thus, consumers who jointly participate in a particular tradeline, either through marriage, authorization, or contractually, are associated and their individual credit histories and other identifying information can be presented to the on-line user. By making and displaying associations, the on-line system can provide a report of each person associated with a particular tradeline and facilitate other activities including skip-tracing and marketing. Thus, information (addresses, financial relationship, equal credit opportunity act level, etc.) on other consumers associated with a base consumer tradeline may be reported to the on-line consumer credit data reporting system user.

The on-line consumer credit data reporting system has an online product catalogue for providing customers with a full suite of traditional credit analysis products, including credit reports, prescreened lists, collection reports and other credit grantor products.

Credit reports are the primary on-line product purchased by credit grantors. A credit report contains all of the identification, trade account and public records information found in the data base of the on-line consumer credit reporting agency. Credit reports can be delivered in either machine readable or human readable formats.

The single-instance data base can store and maintain twenty four months of data detailing each consumer's monthly credit balances, payment information and past due amounts. The advanced logic for matching inquiries to correct credit files yields fewer incorrectly purchased credit reports. This feature reduces the chance of consumer relations problems due to mistaken access of the wrong credit file.

Credit grantors can obtain a consumer's file by using the consumer's account number with that credit grantor. In addition to lowering costs with fewer key strokes, this feature results in accurate file retrieval, even in cases involving multiple names, addresses or social security numbers.

The on-line graphical user interface (GUI) as shown in FIGS. 3-14 provides the capability to deliver credit reports in an on-line user specified format and allows for easy retrieval and analysis of credit reports in a graphical representation.

Products provided by the on-line consumer data reporting system can include collection reports (as shown in FIG. 1), skip-locating service (which may be based on information as shown in FIG. 14), on-line decoding (as shown in FIG. 7), and trend data (as shown in FIGS. 5, 6, 8, 9, 11). Collection reports are designed for skip-tracing purposes and to help locate individuals who have "skipped" out on a debt. The report contains full consumer identification information including name, address and phone numbers of all credit grantors that submit account information to the consumer's file. With this report a collector can contact other creditors to uncover new addresses for the consumer.

The skip-locating service allows a creditor to place a flag in the consumer's file that generates a notification every time a new consumer address is uncovered. The new address information may come from an inquiry to the file or from an accounts receivable tape. Such information is stored as shown in FIG. 14. The on-line decode service will display the full name, address and phone numbers of every credit grantor listed on the credit reports, as partially shown in FIG. 7. Other information concerning the credit grantor can be presented in other "pop-up" screens. Tradelines, inquiries and public record providers will all be decoded. This add-on product is used by collection agencies and mortgage credit reporting companies to allow them to contact creditors listed in the report.

Trend data will allow lenders to greatly enhance their internal and/or external collection strategies by identifying those debtors who are likely to pay delinquent balances. Delinquent customers with a trend that reflects a willingness and ability to repay can be offered attractive repayment alternatives and even the possibility of remaining a customer. Those customers' accounts with negative trends can be denied further credit, or closed and sent to an outside agency for collection. Thus, the information presented in FIGS. 5, 6, 8, 9, 11 results in more accurate decision making capabilities by on-line users.

Products provided by the on-line consumer data reporting system may include prescreened lists compiled using one of two methods. One method involves taking criteria provided by on-line users and returning the names from those lists that pass the criteria established by the on-line user. Such lists can be communicated to the on-line consumer credit data reporting system by CPU-CPU clients as shown in FIGS. 1 and 2. Thus, a credit grantor may wish to prescreen a list of prospects for a new credit card, or buyers of particular products or services that may be of interest. For example, buyers of certain magazines or products may be likely to purchase a home and therefore could be targeted for directed advertising.

The other method involves direct extraction of data from the massive single instance data base. Thus, lists of consumers matching a series of criteria (e.g., income level, credit scores, purchasing habits) can be offered to customers as a separate product that may further be used in mailing or direct marketing campaigns, or for other uses. These prescreened lists are an integral part of most direct mail credit offers.

The system allows selected credit grantors to develop and test prescreen criteria on-line against a national data base. Modeling against a national file rather than a regional file gives the credit grantor more accurate statistics at the beginning of a program. Thus, credit grantors can assess prescreen criteria dynamically on current national data as opposed to relying on out of date or partial data.

Prescreens can be performed against the on-line data base as stored in DASD 112 (FIG. 1) rather than an archived copy of the data base. By using real-time, on-line data, prescreen decisions using the on-line data base more accurately reflect current consumer debt standings, and provide a better indication of credit risk.

The on-line data base includes a number of ancillary data bases. Multiple data files of census demographics and other information can be incorporated into the prescreen process. This allows the credit grantor to target more specific audiences in prescreen mailings, thus enhancing a response.

Other products provided by the on-line consumer data reporting system may include: credit risk scores, fraud alert services, report summaries and address search features. Credit risk scores are added to credit reports as a modeled indictor of a consumer's propensity to conduct its business and lifestyle in a certain way. An on-line user may select such reporting as shown in FIG. 3. Scores may be generic for all credit grantors, generic for a specific type of credit grantor, or custom developed for an individual credit grantor. Generic scores in use at current repositories include: bankruptcy risk scores, delinquency risk scores, response probability scores, profitability scores and collection scores.

The system can provide a fraud alert service. The system will maintain a data base of mail drop addresses, prison addresses, and names and social security numbers that have previously been used in credit fraud activities. A customer may elect to have their inquiries compared against this data base and the result displayed on the credit report.

The system can provide a report summary. A summary of the information on a credit report may be purchased as an enhancement to a full credit report, or it may be purchased as a single product.

The system can provide an address search feature. This feature validates a consumer's current and previous addresses based on the input of name, prior address, social security number, or other identifying information (e.g. driver's license number) at the time a credit report is ordered, as shown in FIG. 4. This invention can thus be marketed as a locate tool.

Figure 15:
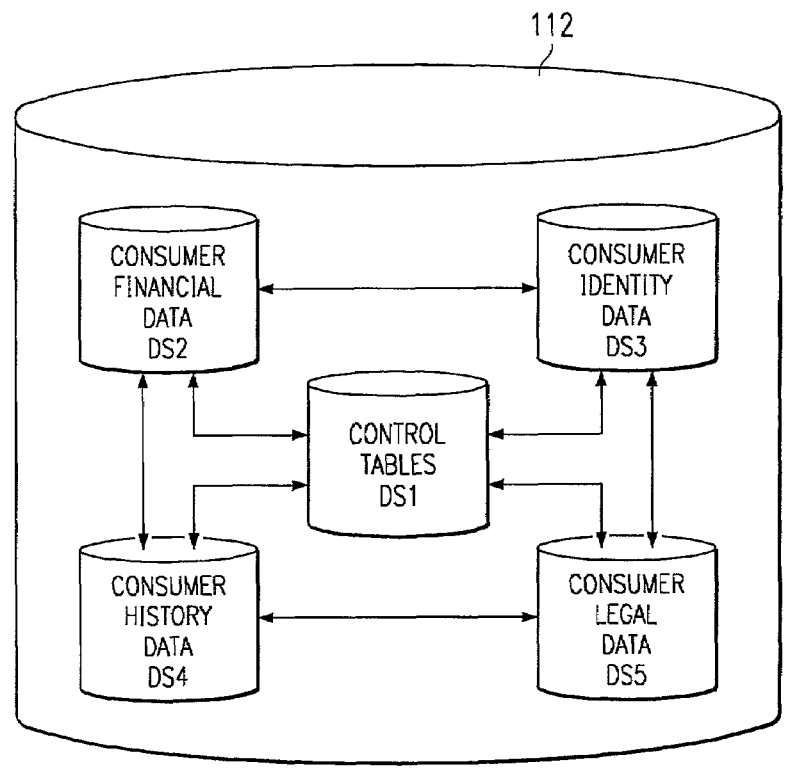
FIG. 15 is a drawing depicting the data is of a single-instance relational data base with the particular data stores encompassed within the data base shown in FIG. 1.

Turning now to FIG. 15, there is shown in more detail the single-instance relational data base 112 noted in FIG. 1 as the DASD 112. The single instance data base 112 is comprised of various individual files and control tables. The arrows between the files depict the interrelationship therebetween such that the result is a relational data base. Data store DS1 contains the control tables necessary to employ all the rules governing the updating of the data-stores, including those rules inherent within the relational data base software. To that end, the control tables of the DS1 data base control the activity between the other individual data bases. Data Store DS2 contains the financial data elements such as account numbers and payment amounts of each consumer identified in the data base 112. Data Store DS3 contains all identifying information for individuals, including names, addresses, date of birth, Social Security Number information as well as any other information that may be used to indicate a unique identity. Other identifying features could include digital fingerprints, retinal scans and digitized photographs. Data Store DS4 contains all data of historical importance. This data is specified as needing little or no future updating and as such is structured within the data base 112 for optimum high speed storage and retrieval. Data Store DS5 contains all data of a legal nature including but not limited to public records i.e., data store judgments, tax liens, bankruptcies, etc.

Figure 16:
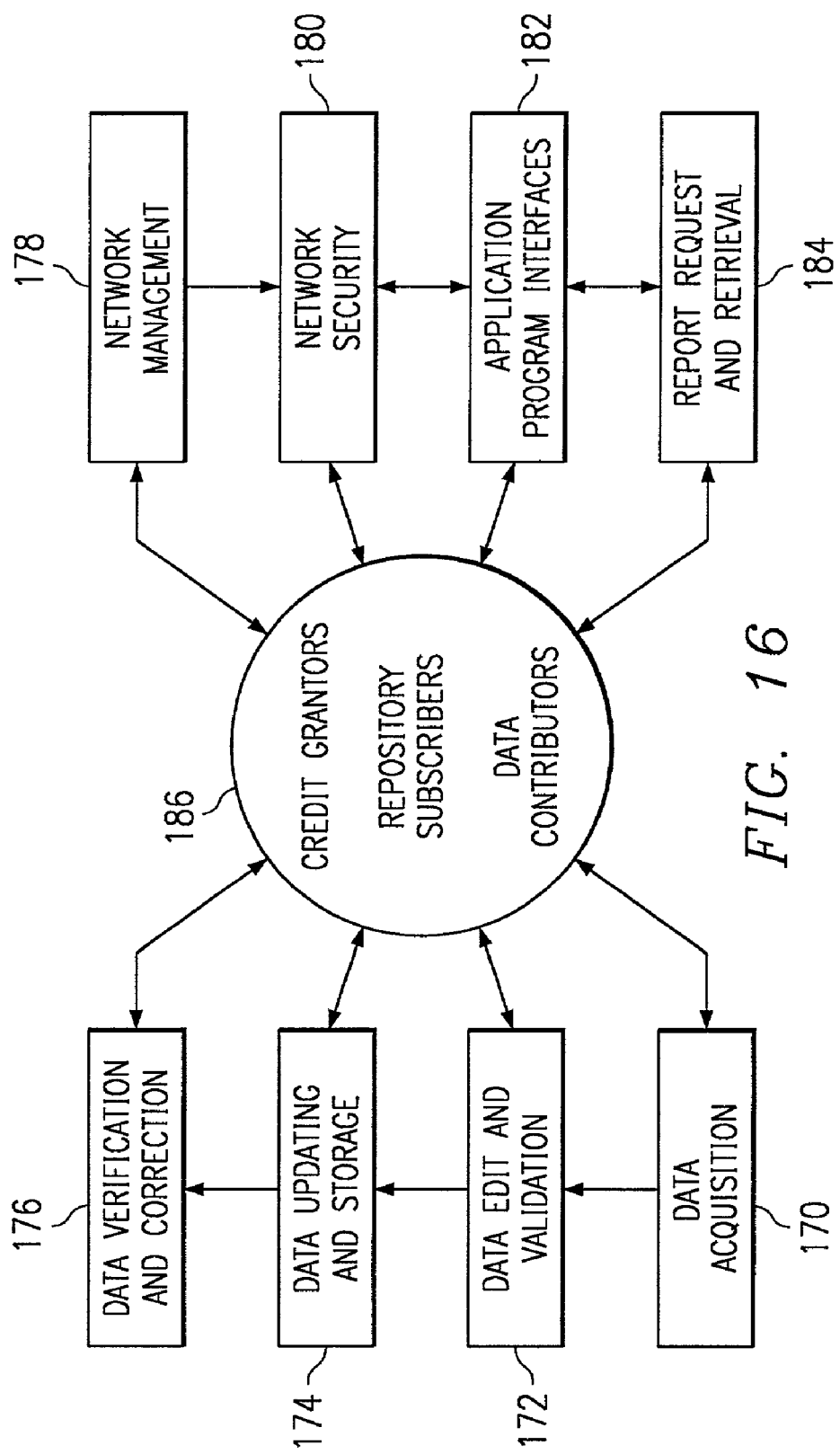
FIG. 16 is a drawing depicting the cycle of data processing and data delivery within the credit industry.

FIG. 16 is a diagram showing the data information flow between the various functional apparatus and entities. Reference numeral 170 represents the data acquisition process which involves the incoming transmission of credit data as well as any other financial data to be stored in the repository. Data is introduced into the system via various media types including but not limited to round reel tape, cartridge tape, floppy diskettes and electronic transmissions. The data edit and validation programs are shown as module 172. This software insures adherence to industry standard formats and contents. Any data failing to qualify will be retained from updating and returned to the sender with explanations of rejection. Data update and storage module 174 contains the processes and programs that may be purchased and/or proprietary that actually perform the updating and adding of new data to the repository. All rules for updating the data are imbedded within the proprietary code and all rules to insure integrity and cardinality of the data base are provided by data updating and storage software. Software module 176 depicts the data verification and correction processes. The invention provides for automatic data verification utilizing statistical averaging of data attributes as individual decisioning points for verification of proper updating. If variances, which are set manually and calculated automatically, are out of sync, the system will notify the specified person or persons and in some instances automatically corrects the erroneous data. This area also allows for manual correction of data by use of proprietary written software. This process has interfaces with outside service providers for sharing data changes within the industry, thus providing enhanced consumer service. The software modules 170, and 176 are resident in DASD 112 of FIG. 1.

The network management equipment 178 includes all purchased hardware and software as well as custom software utilized to control and provide network access to the repository data base. This includes all routers, front-end processors, network management software and transport services. The network security software 180 is commercially available, and contains all log on, password and connectivity aspects of the system. Network security is the first level of security for protecting the system, and is followed by application and data base levels of security. Application program interfaces software 182 is provided to allow custom programs and packaged software to be accessed via various standard protocols. Report request and retrieval software 184 is the process by which subscribers to the service actually provide the identifying information of an individual, and the system retrieves the requested data while performing a match to the data base and any custom analysis requested by the subscriber. The software 182 and 184 is resident on the terminal server 109 of FIG. 1.

The hub 186 of FIG. 16 represents the participants in the process. Credit grantors provide data to the system that is used to build and enhance the repository data base. Credit grantors also become subscribers who purchase the composite data from the repository. Other data contributors may include providers of public record information and providers of demographic information on individuals. The latter participants typically do not purchase data from the repository data base.

The foregoing sets forth many examples in which historical credit information is maintained in the data base and made available to on-line users as graphical user interfaces. This differs from traditional credit information data bases, in that the conventional technique is to provide the user with the most current credit information, and not historical data information. As noted above, erroneous decisions can often be made based on current credit information, in that a first consumer and a second consumer can have very similar credit information at a certain point in time, but the credit histories are vastly different. It is obvious that given this situation, the credit worthiness of one consumer having a good history of payment is much better than another consumer who has a poor history of payments toward reducing the balance, even though both consumers have similar credit data, if assessed only at one point in time.

Figure 17:
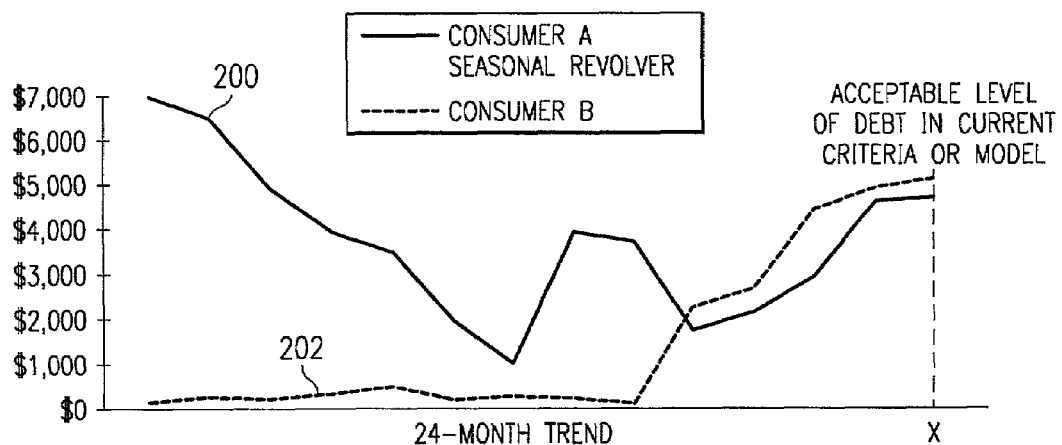
FIG. 17 graphically depicts a comparative analysis of the credit histories of two consumers who have vastly different credit histories, but at time "X", have similar credit balances.

FIG. 17 illustrates such a situation. Here, line 200 illustrates consumer A who has a revolving account. Line 202 represents consumer B who also has a revolving account. The horizontal axis of the graph illustrates a twenty-four month trend and the vertical axis indicates the account balance. It is noted that consumer A initially has a high balance which is reduced by payments, the balance again rises, but again is reduced by other payments, and then the balance again rises to the point in time labeled "X". This type of credit consumer is termed a "seasonal revolver," as goods or services are purchased during the year, perhaps at holidays such as Christmas, Thanksgiving, etc., but the balances are paid off. This type of consumer is attractive and desired, in that the consumer pays the balance plus interest charges in a timely manner, thereby representing a profitable consumer to the credit card business industry. In contrast, consumer B has had a very low balance for a major portion of the twenty-four month period, but the balance increases in the last period of the time, and is a little greater than the balance of consumer A at the period in time denoted by the vertical line X. If an on-line user only had available the most current credit information at the time X, then consumer B would not look a lot different from consumer A, in terms of credit balances. However, when the historical credit information of consumer A is made available, it becomes clear that the credit risk of consumer A is much superior to that of consumer B. In accordance with an important feature of the invention, not only is the historical credit information made available to the on-line user, but such information is presented in a highly efficient and usable form.

As can be appreciated from the description of the invention herein, the on-line consumer credit data reporting system and method of operation thereof involves principles and concepts that overcome many of the shortcomings and disadvantages of the prior art consumer credit reporting systems.

Therefore, while the preferred and other embodiments of the methods and apparatus have been disclosed with reference to specific software and hardware structures, techniques and the like, it is to be understood that many changes in detail may be made as a matter of engineering choices without departing from the spirit and scope of the invention, as defined by the appended claims. Indeed, those skilled in the art may prefer to embody the apparatus and/or software in other forms, and in light of the present description, they will find it easy to implement that choice. Also, it is not necessary to adopt all the various advantages and features of the present invention in a single embodiment or assembly in order to realize the individual advantages disclosed herein.

What is claimed is:

1. A data system for storing consumer credit information, comprising:
    a computer-readable data base programmed to store current credit information and programmed to store historical consumer credit information for a period at least greater than twelve months;
    said data base storing data providing historical consumer credit information, said historical consumer credit information including dollar amount credit information for each period of a plurality of periods of historical times, thereby allowing a user of said data system to examine a quality of a credit history; and
    a computer programmed to access said data base to retrieve data therefrom and provide credit information to users of said data system.

2. The data system of claim 1, wherein said data system is programmed to periodically receive data from local and regional credit grantors, and store the received data for subsequent retrieval.

3. The data system of claim 1, wherein said data system is programmed to store original credit application data, and programmed to accumulate credit application data received thereafter by said data system.

4. The data system of claim 3, wherein said data system is programmed to store a substantially complete credit history of a consumer, as supplied by one or more credit grantors.

5. The data system of claim 1, wherein said data system includes a single-instance data base of the type in which consumer credit data is both updated and consumer credit report data is retrieved therefrom.

6. The data system of claim 5, further including a mirrored data base for duplicating the consumer credit data.

7. The data system of claim 1, wherein said data system is programmed to process consumer credit data accumulated by said data system from multiple credit grantors and provide trend data.

8. The data system of claim 7, wherein said data system is programmed to aggregate consumer credit account balances from multiple credit grantors and provide said trend data for one or more consumers identified in said data system.

9. The data system of claim 1, wherein said data system is programmed to accumulate address information of consumers desiring credit from credit grantors, and programmed to store in association with said address information a date in which the address information of the consumers was reported to said data system.

10. The data system of claim 9, wherein said data system is programmed to store the number of times credit grantors reported to the data system the same address information for a respective consumer.

11. The data system of claim 1, further including in combination a credit report produced by said data system, said credit report containing substantially all of the consumer identification information, and substantially all of the trade line consumer credit information stored in the data system in association with a respective consumer.

12. The data system of claim 1, wherein said data system is programmed to store consumer information to produce a collection report, said collection report including name, address, and phone number information of all credit grantors who have submitted consumer credit information to the data system for respective consumers.

13. The data system of claim 1, wherein said data system is programmed to respond to a request to flag a consumer file, said flag indicating that new address information has been stored in association with the flagged consumer file, and said data system is programmed to transmit the new address information to the person requesting that the consumer file be flagged.

14. A data system for storing consumer credit information, comprising:
 a computer-readable data base for storing the consumer credit information;
 a computer for accessing the data base to store consumer credit information and responsive to requests for retrieving the consumer credit information;
 a network for allowing credit grantors to communicate requests to said computer, said requests including requests to store consumer credit information, and requests for consumer credit reports; and
 said computer programmed to store original consumer credit information supplied by the credit grantors, and to store substantially all new consumer credit information subsequently submitted by the credit grantors, thereby storing a complete credit history of the respective consumers.

15. The data system of claim 14, wherein said computer is programmed to accumulate consumer credit information in said data base for respective consumers over a long period of time, and maintain said accumulated consumer credit information so that a trend analysis can be conducted thereon.

16. The data system of claim 14, wherein said computer is programmed to accumulate consumer credit information for respective consumers by receiving requests to store consumer credit information from different credit grantors.

17. The data system of claim 14, wherein said computer is programmed to store consumer credit information to provide a complete credit history of respective consumers for at least twenty four months.

18. A data system for storing consumer credit information, comprising:
 a computer-readable data base for storing the consumer credit information;
 a computer for accessing the data base to store consumer credit information and responsive to requests for retrieving the consumer credit information;
 said data base structured for storing dollar value parameters associated with monthly periods for respective consumers, and accumulating and maintaining the dollar value parameters for a period of at least twenty four months for respective consumers; and
 said computer programmed to provide to the credit grantors trend data for the respective consumers, said trend data showing the dollar value parameters for each month for the period.

19. The data system of claim 18, wherein said computer is programmed to provide a graphical depiction of the consumer credit information by depicting the dollar value parameter on one axis of a graph, and the months of the period on another axis of the graph.

20. The data system of claim 18, wherein said computer is programmed to provide for each said credit grantor a graphical depiction of a consumer's balance owed to the credit grantor as a function of the month of the period.

* * * * *